United States Patent [19]

Smoot

[11] Patent Number: 4,949,397

[45] Date of Patent: Aug. 14, 1990

[54] DETECTOR FOR OPTICALLY TRANSMITTED TELEVISION SIGNALS

[75] Inventor: Lanny S. Smoot, Morristown, N.J.

[73] Assignee: Bell Communications Research, Inc., Livingston, N.J.

[21] Appl. No.: 236,188

[22] Filed: Aug. 25, 1988

[51] Int. Cl.$^5$ .................................... H04B 10/06
[52] U.S. Cl. .................................... 455/619; 455/605
[58] Field of Search .................................... 455/601–603, 455/606–608, 612, 617–619, 269, 290, 292, 605

[56] References Cited

U.S. PATENT DOCUMENTS

| | | | |
|---|---|---|---|
| 4,149,186 | 4/1979 | Chung et al. | 455/603 |
| 4,150,284 | 4/1979 | Trenkler et al. | 455/608 |
| 4,350,973 | 9/1982 | Petryk | 455/612 |
| 4,614,968 | 9/1986 | Rattman | 340/630 |

FOREIGN PATENT DOCUMENTS

| | | | |
|---|---|---|---|
| 0087946 | 7/1981 | Japan | 455/605 |
| 0077788 | 4/1987 | Japan | 358/ |

OTHER PUBLICATIONS

Video Users Handbook, Peter Utz, Prentice Hall Inc. 1980 p. 26.

Primary Examiner—Joseph A. Orsino
Assistant Examiner—L. Van Beek
Attorney, Agent, or Firm—James W. Falk

[57] ABSTRACT

A low cost and extremely simple interface between a standard television receiver and an optical fiber carrying properly formatted intensity modulated optical signals is disclosed. Illustratively, the interface is a P-I-N diode or other photovoltaic element which is directly connected to the antenna terminals of a standard television set. In many applications, the resulting interface is self sufficient and no external power source is required.

6 Claims, 2 Drawing Sheets

DETECTOR FOR OPTICALLY TRANSMITTED TELEVISION SIGNALS

FIELD OF THE INVENTION

The present invention relates to the detection of television signals which are transmitted via an optical carrier.

BACKGROUND OF THE INVENTION

It is generally known that a photovoltaic device such as a P-I-N diode can be used to detect information encoded on an optical carrier. When a P-I-N diode is used to detect information encoded on an optical carrier, the P-I-N diode output is generally coupled to a plurality of amplifier and signal processing stages such as a low noise preamplifier and a linear channel amplifier. Such circuitry is expensive and may not enhance the information detecting capability of the P-I-N diode. In addition, when combined with such amplifier and signal processing stages, the P-I-N diode is not suitable for price sensitive mass market applications such as an interface between a standard television receiver and an optical fiber carrying a TV signal.

It is an object of the present invention to use a P-I-N diode to detect television signals encoded on an optical carrier without the use of complex amplification and other signal processing stages following the P-I-N diode.

SUMMARY OF THE INVENTION

The present invention is an extremely simple, low cost and easily reproducible interface between a standard television receiver and an optical fiber carrying properly formatted intensity modulated optical signals. The interface is a properly mounted photosensitive device such as a P-I-N diode. The diode is connected to the 300 or 75 ohm antenna terminals of a standard television receiver. In a preferred embodiment of the invention, no other devices are required and the resulting interface is completely self-contained, requiring no external power supply for biasing or any other purpose.

In short, it has not been heretofore known that a standard commercially available television receiver has sufficient sensitivity and dynamic range (range of signal from smallest to largest over which proper operation is obtained) such that the photogenerated signal of a single photosensitive semiconductor device such as a P-I-N diode is sufficient, by itself, to drive the input terminals of a standard television set.

BRIEF DESCRIPTION OF THE DRAWINGS

In the Figures, like numerals are utilized to identify like features.

DETAILED DESCRIPTION OF THE INVENTION

Figure 1:
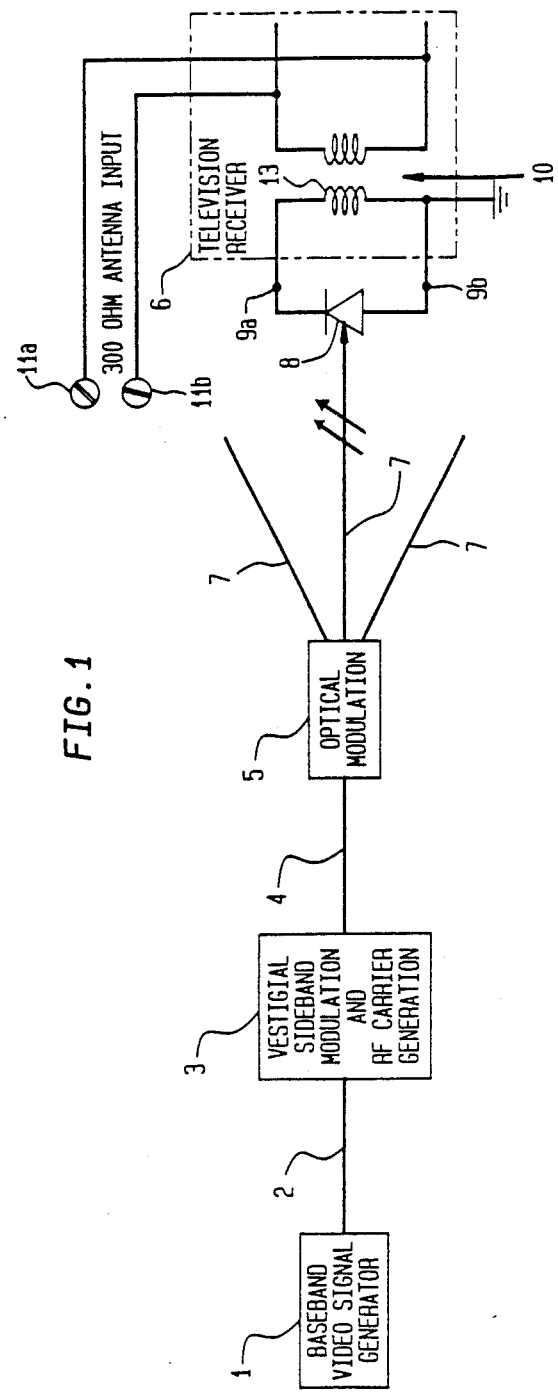
FIG. 1 schematically illustrates a transmission system in which a P-I-N diode by itself is used as an interface between a standard television receiver and an optical fiber in accordance with an illustrative embodiment of the present invention.

A television transmission system in accordance with the present invention is illustrated in FIG. 1. Illustratively, a video signal generator 1, such as a TV camera, generates a baseband video signal. The baseband signal is transmitted via transmission line 2 to a modulation unit 3. At the modulation unit 3, the video signal is modulated onto a radio frequency signal occupying a portion of the frequency spectrum normally used to broadcast commonly available VHF or UHF television signals. Illustratively, the video baseband signal is modulated onto the radio signal using a type of modulation known as vestigal sideband modulation to produce a radio frequency signal having a bandwidth of approximately 6 MHz. The radio frequency signal is then transmitted via transmission line 4 to an optical modulation unit 5. At the optical modulation unit, the radio frequency signal is intensity modulated onto an optical carrier. The optical signal is then broadcast to one or more conventional television receivers 6 via optical fibers 7.

The optical signal is detected at the television receiver 6 by a photovoltaic element 8 which illustratively is a P-I-N diode. The P-I-N diode 8 is connected to the antenna terminals 9a, 9b of the conventional television receiver 6. Presently available television receivers typically have a set of antenna terminals having an impedance of 75 ohms and/or a set of antenna terminals having an impedance of 300 ohms. Illustratively, the terminals 9a, 9b are 75 ohm terminals. Typically, the 75 ohm antenna terminals are connected to a Balun type transformer 10 located in the television receiver. The Balun type transformer serves as an interface between the 75 ohn antenna terminals and a twin line cable (not shown) which has an impedance of 300 ohms. The typical television also has a set of 300 ohm antenna terminals designated 11a, 11b in FIG. 1. The 300 ohm terminals bypass the transformer 10. It should also be noted that the primary coil 13 of the transformer 10 provides a DC path for the current produced by the P-I-N diode 8. Such a DC path is highly desirable for proper operation of the P-I-N diode.

In short, in FIG. 1, a single P-I-N diode is used as an interface between a standard television receiver and an optical fiber carrying properly formatted intensity modulated optical signals. In the embodiment of the invention shown in FIG. 1, no other devices are required and the resulting interface is completely self-contained and requires no external power supply. The present invention exploits the fact that the standard television set has sufficient sensitivity and dynamic range such that the P-I-N diode's photogenerated signal along is sufficient to directly drive the television set's input terminals.

It is desirable to use a P-I-N diode with as small a capacitance as possible. If the P-I-N diode has too high a capacitance, it may be too slot to decode higher frequency channels, such as som UHF channels, from an intensity modulated optical carrier. Some of the factors which determine the capacitance of a P-I-N diode are the area of the device and the thickness of the intrinsic region located between the P-type region and the N-type region. Instead of using a P-I-N diode as the interface between a television receiver and an optical fiber, other types of photovoltaic devices may be used. One example of such a device is an unbiased avalanche photodiode.

In a preferred embodiment of the invention, an interface unit is formed by mounting the P-I-N diode or other photovoltaic device in a small package functionally designed to interface with a particular type of antenna connection. One type of standard antenna connection is the "F" type which has an impedance of 75 ohms. An interface unit for mating with an "F" type antenna connection is illustrated in FIG. 2.

Figure 2:
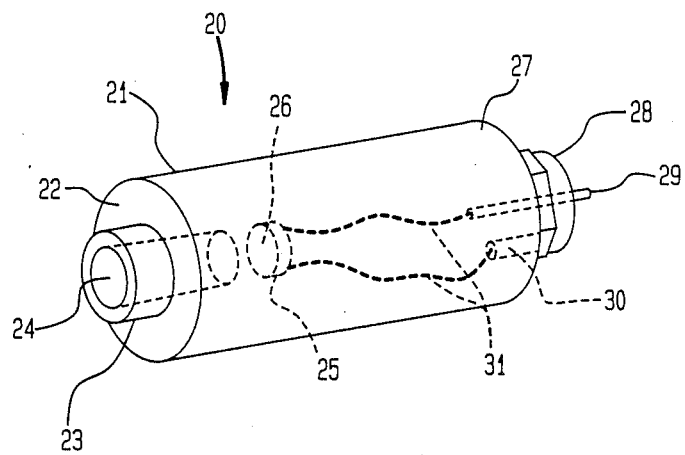
FIGS. 2, 3 and 4 schematically illustrate packages for mounting a P-I-N diode to a television receiver, in accordance with illustrative embodiments of the present invention.

The interface unit of FIG. 2 serves as a connecting means involving no active signal processing element, for connecting a photovoltaic element to a set of antenna terminals. In particular, in FIG. 2, the photovoltaic element is directly connected to the antenna terminals.

The interface unit 20 of FIG. 2 comprises a cylindrical housing 21. At a first end 22 of the housing 21, a fiber optic connector 23 is located for receiving an optical fiber in a bore 24 thereof. Located inside the cylindrical housing 21 is a P-I-N diode 25 which has a light sensitive surface 26.

The end 27 of the cylindrical housing 21 includes a male "F" connector 28. The male F connector 28 is adapted to mate with a female F connector which typically forms the antenna terminals of a commercially available television. The male F connector 28 includes a center electrode 29 and a ground electrode 30. The leads 31 of the P-I-N diode 25 are connected to the electrodes 29, 30 of the male F connector 28. Intensity modulated light from an optical fiber (not shown in FIG. 2) which is terminated by the connector 23 impinges on the light sensitive surface 26 of the PIN diode 15 to produce an electric current which is delivered by the diode leads 31 to the electrodes 29, 30 of the F connectors. As indicated by FIG. 1, the electrodes of the F connector may be connected to a Balun type transformer located inside the television set. As alternative interface housing is utilized if the P-I-N diode interface is to be connected to the screw type 300 ohm antenna terminals of a television. In this case, electrodes which can mate with screw type terminals replace the F type connector of FIG. 1.

Figure 3:
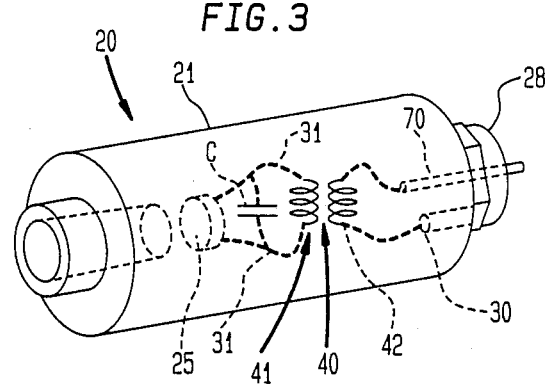

FIG. 3 shows an embodiment of the invention in which a transformer 40 is included within the housing 21. Such a transformer has a high impedance primary coil 41 and a low impedance secondary coil 42. The high impedance primary coil is connected to the P-I-N diode leads 31 and the low impedance secondary coil is connected to the electrodes 29, 30 of the male F connector 28. In this case, the transformer is used to step up the current applied to the 75 ohm inputs. This increases the light-input to voltage-output efficiency of the arrangement while keeping the interface unit totally self-contained and without requirements for external power.

In some circumstances, the intrinsic capacitance (designated C in FIG. 3) of the P-I-N diode or other detector may be utilized to advantage. Illustratively, a plurality of radio frequency signals, corresponding to a plurality of television channels, may be modulated onto a single optical carrier and detected by the P-I-N diode 25. In this case, the primary coil 41 may be designed (for example by choosing the core and the number of turns) so that when combined with the intrinsic capacitance C, a narrow band pass filter for one of the television channels results.

Figure 4:
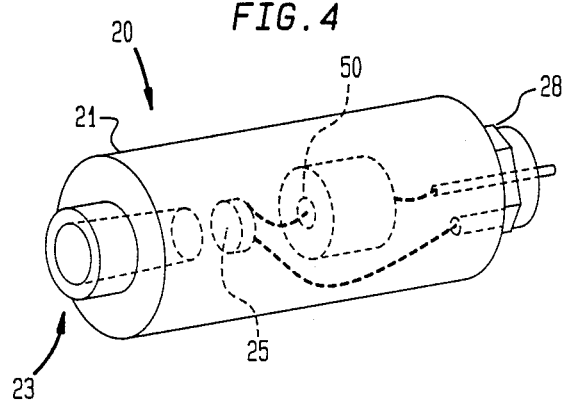

In an alternative embodiments of the interface unit, shown in FIG. 4, a long lasting and compact battery 50 is packaged with the diode 25 in the housing 21 to serve as a bias supply. Since this battery would be applied in the reverse bias direction across the diode, the amount of current drawn from the battery is minuscule. The battery life in this application is essentially its shelf life which can be up to ten years in the case of certain lithium batteries. The battery serves to increase the bandwidth provided by the P-I-N diode because the capacitance of the P-I-N diode is lowered when it is reverse biased. However, it should be noted that the interface of the present invention has successfully received commercial TV channels from channel 2 (approximately) 54 MHz) to channel 13 (approximately 220 MHz) without the use of a battery.

Finally, the above-described embodiments of the invention are intended to be illustrative only. Numerous alternate embodiments may be devised by those skilled in the art without departing from the spirit and scope of the following claims. For example, the P-I-N diode may be used as a receiver for FM radio signals in the range of 88–108 MHz when such FM radio signals are transmitted by intensity modulating an optical carrier.

What is claimed is:

1. An interface unit for a television receiver consisting essentially of
   a single photo-sensitive semiconductor device to which no power is applied for detecting an optical carrier signal modulated with a radio frequency signal, said single photo-sensitive semiconductor device being directly connected to a set of antenna terminals of said television receiver for transmitting said radio frequency signal directly to said television receiver.

2. The interface unit of claim 1 wherein said photo-sensitive semiconductor device is a P-I-N diode.

3. An interface unit for a television receiver consisting essentially of:
   a single photo-sensitive semiconductor device to which no power is applied for detecting an optical carrier signal modulated with a radio frequency signal, and
   connecting means including no active signal processing elements for connecting said single semiconductor device to a set of antenna terminals of said receiver so that said radio frequency signal is transmitted to said receiver.

4. The interface unit of claim 3 further consisting essentially of a transformer element incorporated as part of said connecting means.

5. An interface unit for a television receiver consisting essentially of
   a single photo-sensitive semiconductor device for detecting an optical carrier signal modulated with a radio frequency signal and a source of reverse bias voltage for reverse biasing said semiconductor device to increase a detection bandwidth provided by said semiconductor device, said semiconductor device drawing a minuscule amount of current from said source of reverse bias, and
   connecting means including no active signal processing elements for connecting said reverse biased semiconductor device to a set of antenna terminals of said receiver so that said radio frequency signal is transmitted to said receiver.

6. The interface of claim 5 further consisting essentially of a transformer element incorporated as part of said connecting means.

* * * * *